(12) United States Patent
Tanaka

(10) Patent No.: US 10,723,236 B2
(45) Date of Patent: Jul. 28, 2020

(54) ELECTRICAL VEHICLE SYSTEM WITH CONVERTERS TO SHARE POWER BETWEEN FUEL, CELL, HIGH VOLTAGE BATTERY AND LOW VOLTAGE BATTERY

(71) Applicant: NISSAN MOTOR CO., LTD., Yokohama-shi, Kanagawa (JP)

(72) Inventor: Daiki Tanaka, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 16/319,566

(22) PCT Filed: Jul. 29, 2016

(86) PCT No.: PCT/JP2016/072396
§ 371 (c)(1),
(2) Date: Jan. 22, 2019

(87) PCT Pub. No.: WO2018/020675
PCT Pub. Date: Feb. 1, 2018

(65) Prior Publication Data
US 2019/0337403 A1 Nov. 7, 2019

(51) Int. Cl.
*B60L 50/75* (2019.01)
*H01M 8/04228* (2016.01)
(Continued)

(52) U.S. Cl.
CPC ............... *B60L 50/75* (2019.02); *B60L 53/20* (2019.02); *B60L 58/20* (2019.02);
(Continued)

(58) Field of Classification Search
CPC ....................................................... B60L 50/75
(Continued)

(56) References Cited

U.S. PATENT DOCUMENTS 6,507,506 B1 * 1/2003 Pinas .................... H02M 3/005
363/79
6,559,621 B2 * 5/2003 Corless ............... H01M 6/5033
307/9.1
(Continued)

FOREIGN PATENT DOCUMENTS

JP 2005-322454 A 11/2005
JP 2007-157477 A 6/2007
(Continued)

*Primary Examiner* — Adi Amrany
(74) *Attorney, Agent, or Firm* — Foley & Lardner LLP

(57) ABSTRACT

A vehicle system includes a motor, a first device connected to the motor and configured to supply the motor with power, a fuel cell connected to the first device and configured to charge the first device, a second device connected to the fuel cell, a first converter interposed between the fuel cell and the first device and configured to adjust a voltage from one of the fuel cell or the first device and to supply power to the other, a second converter interposed between the fuel cell and the second device and configured to adjust a voltage from the second device and to apply the adjusted voltage to the fuel cell, and a third converter interposed between the first device and the second device and configured to adjust a voltage from one of the first device or the second device and to supply power to the other.

19 Claims, 4 Drawing Sheets

(51) Int. Cl.
  *H01M 8/04303* (2016.01)
  *B60L 53/20* (2019.01)
  *B60L 58/20* (2019.01)
  *H01M 8/04537* (2016.01)
  *H01M 8/04664* (2016.01)
  *H01M 8/04858* (2016.01)

(52) U.S. Cl.
  CPC ... *H01M 8/04228* (2016.02); *H01M 8/04303* (2016.02); *H01M 8/04567* (2013.01); *H01M 8/04597* (2013.01); *H01M 8/04626* (2013.01); *H01M 8/04686* (2013.01); *H01M 8/04873* (2013.01); *H01M 8/04888* (2013.01); *B60L 2270/00* (2013.01); *H01M 2250/20* (2013.01)

(58) Field of Classification Search
  USPC .................................................. 307/9.1, 10.1
  See application file for complete search history.

(56) References Cited

U.S. PATENT DOCUMENTS

| | | | | |
|---|---|---|---|---|
| 8,012,638 | B2* | 9/2011 | Konoto | H01M 8/04082 320/101 |
| 2008/0087479 | A1* | 4/2008 | Kang | H01M 8/04559 180/65.31 |
| 2012/0053766 | A1* | 3/2012 | Ham | B60L 3/0053 701/22 |
| 2012/0141895 | A1* | 6/2012 | Kwon | H01M 8/04037 429/429 |
| 2013/0288148 | A1* | 10/2013 | Kazuno | H01M 8/04089 429/444 |
| 2014/0113162 | A1 | 4/2014 | Hottinen et al. | |
| 2015/0155577 | A1* | 6/2015 | Jung | H01M 8/04753 429/431 |
| 2015/0283915 | A1* | 10/2015 | Kim | B60L 58/27 320/104 |
| 2016/0006059 | A1* | 1/2016 | Kwon | H01M 8/04335 429/434 |
| 2016/0229310 | A1* | 8/2016 | Min | B60L 58/33 |
| 2017/0310142 | A1* | 10/2017 | Watanabe | H02J 7/0054 |

FOREIGN PATENT DOCUMENTS

| | | |
|---|---|---|
| JP | 2013-198289 A | 9/2013 |
| JP | 2014-523081 A | 9/2014 |

* cited by examiner

ELECTRICAL VEHICLE SYSTEM WITH CONVERTERS TO SHARE POWER BETWEEN FUEL, CELL, HIGH VOLTAGE BATTERY AND LOW VOLTAGE BATTERY

TECHNICAL FIELD

The present invention relates to a vehicle system.

BACKGROUND ART

A solid oxide fuel cell (SOFC) is expected to function as a fuel cell to be installed on a vehicle from viewpoints such as high efficiency and long-time stability. A configuration with the solid oxide fuel cell installed on the vehicle is such that a high voltage battery for motor driving is charged with generated power, and power generation is stopped when the charging is finished. In a solid oxide fuel cell, a protection voltage for protecting an anode electrode is required to be applied from outside to the fuel cell for implementation of stop control (see Japanese Translation of PCT Application Publication No. 2014-523081). In the vehicle, the foregoing high voltage battery or a low voltage battery for driving an auxiliary machine of the vehicle, etc. may be used as a power supply for the protection voltage.

SUMMARY OF INVENTION

The high voltage battery is electrically disconnected from a motor driving side, that is, from the fuel cell in various situations such as when the vehicle is to be stopped, on the occurrence of a system error, and when the charged amount is small. In such situations, the protection voltage may be applied from the low voltage battery. Meanwhile, a voltage for anode electrode protection is to be applied for a long time. Hence, if the protection voltage is to be applied from the low voltage battery, the low voltage battery is required to have charging performance responsive to large capacity to cause resultant cost increase.

The present invention is intended to provide a vehicle system capable of avoiding increase in the capacity of a low voltage battery in a case where a protection voltage is applied to a fuel cell from the low voltage battery.

A vehicle system according to one embodiment of the present invention is a vehicle system, comprising: a motor configured to drive a vehicle; a high voltage storage device connected to the motor and configured to supply the motor with power; a fuel cell connected to the high voltage storage device and configured to charge the high voltage storage device; and a low voltage storage device connected to the fuel cell, the vehicle system comprising: a bidirectional first voltage converter interposed between the fuel cell and the high voltage storage device, configured to adjust a voltage at either of the fuel cell or the high voltage storage device and to supply power to the other; and a second voltage converter interposed between the fuel cell and the low voltage storage device, configured to adjust a voltage at the low voltage storage device and to apply the adjusted voltage to the fuel cell, wherein the vehicle system comprises a bidirectional third voltage converter interposed between the high voltage storage device and the low voltage storage device, configured to adjust a voltage at either of the high voltage storage device or the low voltage storage device and to supply power to the other.

DESCRIPTION OF EMBODIMENTS

Figure 1:
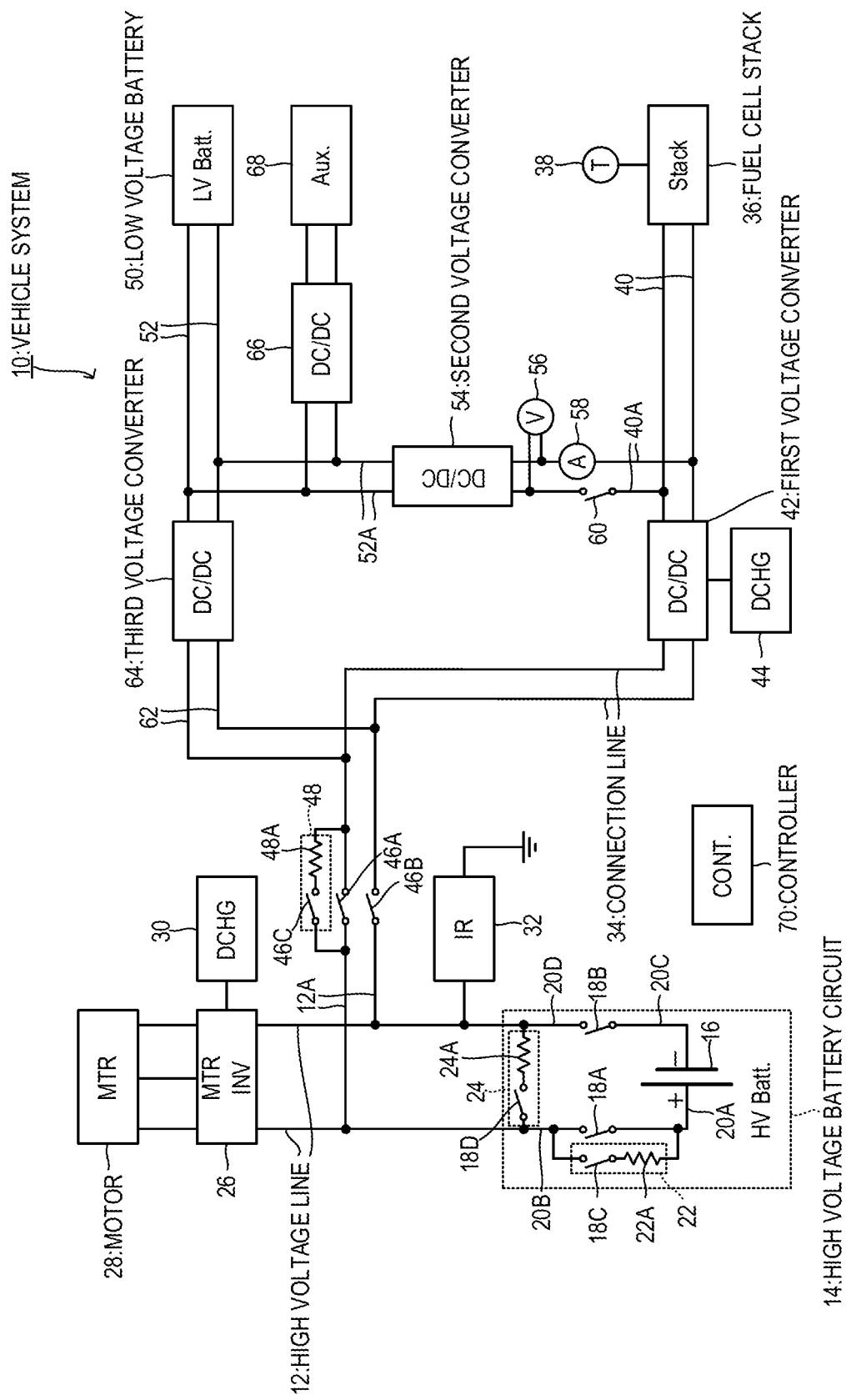
FIG. 1 is a block diagram showing a principal configuration of a vehicle system according to an embodiment.

An embodiment of the present invention will be described below by referring to the drawings.

[Configuration of Vehicle System]

FIG. 1 is a block diagram showing a principal configuration of a vehicle system 10 according to this embodiment. The vehicle system 10 of this embodiment has a configuration where a motor 28 to drive a vehicle and a high voltage battery circuit 14 (high voltage storage device) to supply the motor 28 with power through an inverter 26 are connected through a high voltage line 12 (from 240 to 400 V, for example). Further, a connection line 34 is connected to the high voltage line 12, and a fuel cell stack 36 is electrically connected to the connection line 34. An input/output line 40 connected to the fuel cell stack 36 and a low voltage line 52 connected to a low voltage battery 50 (low voltage storage device) are electrically connected through a second voltage converter 54. Further, the low voltage line 52 and the connection line 34 are electrically connected through a third voltage converter 64. All the components of the vehicle system 10 are controlled by a controller 70 (control part).

The high voltage line 12 has one end portion connected to the high voltage battery circuit 14, and an opposite end portion connected to the inverter 26. An IR sensor 32 is connected to the high voltage line 12. Further, a first branch line 12A (interconnect line) is connected to the high voltage line 12, and the first branch line 12A is electrically connected to the connection line 34.

The high voltage battery circuit 14 includes a main power supply 16 (from 240 to 400 V, for example) electrically connected to the high voltage line 12, a first relay 18A connected to the positive pole side of the main power supply 16, and a second relay 18B connected to the negative pole side of the main power supply 16. The first relay 18A has one side connected to an internal interconnect line 20A connected to the positive pole of the main power supply 16, and an opposite side connected to an internal interconnect line 20B connected to the positive side of the high voltage line 12. The second relay 18B has one side connected to an internal interconnect line 20C connected to the negative pole of the main power supply 16, and an opposite side connected to an interconnect line 20D connected to the negative side of the high voltage line 12.

The high voltage battery circuit 14 includes a first charging circuit 22 connected in parallel to the first relay 18A. The first charging circuit 22 is a series circuit with a third relay 18C and a first charging resistor 22A. The first charging circuit 22 has one end portion connected to the internal interconnect line 20A, and an opposite end portion connected to the internal interconnect line 20B. The high voltage battery circuit 14 further includes a second charging circuit 24 connecting the positive side and the negative side of the high voltage line 12. The second charging circuit 24 is a series circuit with a fourth relay 18D and a second charging resistor 24A. The second charging circuit 24 has one end portion connected to the internal interconnect line 20B, and an opposite end portion connected to the internal interconnect line 20D.

The first charging circuit 22 and the second charging circuit 24 are to be used temporarily for electrically connecting the high voltage battery circuit 14 to the high voltage line 12 to apply electrical charge to a capacitor, for example, in the inverter 26. This avoids a flow of a rush current upon establishment of the connection, thereby avoiding breakage of the high voltage battery circuit 14, the inverter 26, etc.

The inverter 26 is connected to the high voltage line 12 (positive side and negative side). The inverter 26 is to rotate the motor 28 by converting power (DC voltage) supplied from the high voltage battery circuit 14 or the fuel cell stack 36 to three-phase AC power, and supplying the resultant power to the motor 28. The inverter 26 can convert regenerative power generated by the motor 28 when a brake is applied to the vehicle to DC voltage power, and charge the main power supply 16 in the high voltage battery circuit 14 with the resultant power.

If the vehicle system 10 is to be stopped, for example, the high voltage battery circuit 14 is cut off from the high voltage line 12. At this time, electrical charge remains stored in the capacitor of the inverter 26, so that the high voltage line 12 is maintained at a high voltage even after the cutoff. To prevent electrical leak, however, a voltage at the high voltage line 12 is required to be reduced to a voltage equal to or less than a predetermined voltage (60 V, for example). In response to this, a first discharging circuit 30 is attached to the inverter 26. The first discharging circuit 30 is to reduce a voltage at the high voltage line 12 by releasing the electrical charge in the capacitor.

The IR sensor 32 is connected to the negative side of the high voltage line 12 and the body of the vehicle (not shown in the drawings). The IR sensor 32 is to apply a certain voltage between the high voltage line 12 and the body and measure a stray capacitance therebetween. Then, the IR sensor 32 converts the measured stray capacitance to the resistance of the high voltage line 12 to insulation from the body. Thus, the presence or absence of electrical leak in the high voltage line 12 can be determined on the basis of the magnitude of the insulation resistance. If the magnitude of the insulation resistance is larger than a predetermined resistance value, a state of insulation can be determined to be favorable. If the magnitude of the insulation resistance is smaller than the resistance value, the presence of insulation abnormality can be determined.

The fuel cell stack 36 is a solid oxide fuel cell (SOFC), and is a stack of cells each prepared by interposing an electrolyte layer made of a solid oxide such as ceramic between an anode electrode (fuel electrode) to receive supply of fuel gas (anode gas) reformed by a reformer and a cathode electrode (air electrode) to receive supply of air containing oxygen as oxidizing gas (cathode gas).

The fuel cell stack 36 is connected to the input/output line 40, and is connected to the connection line 34 through a first voltage converter 42. A temperature sensor 38 for measuring a temperature in the fuel cell stack 36 is attached to the fuel cell stack 36.

The first voltage converter 42 has one side connected to the connection line 34, and an opposite side connected to the fuel cell stack 36 through the input/output line 40. The first voltage converter 42 is a bidirectional DC/DC converter using the fuel cell stack 36 as a current source (voltage source) and the high voltage battery circuit 14 as a voltage source, for example. The first voltage converter 42 converts a DC voltage through pulse width modulation (PWM) control or pulse frequency modulation (PFM) control.

When the fuel cell stack 36 generates power, the first voltage converter 42 performs output voltage control (output power control) of raising (adjusting) a voltage from the fuel cell stack 36 (input/output line 40), and supplying the raised voltage (power) (adjusted voltage (power)) to the high voltage battery circuit 14 through the connection line 34 and the high voltage line 12. Conversely, if a voltage (protection voltage described later) is to be applied to the fuel cell stack 36, the first voltage converter 42 performs output voltage control of reducing a voltage from the high voltage battery circuit 14 (high voltage line 12, connection line 34), and applying the reduced voltage to the fuel cell stack 36 through the input/output line 40.

A second branch line 40A branches off from the input/output line 40. A third branch line 52A branches off from the low voltage line 52. The second branch line 40A and the third branch line 52A are connected through the second voltage converter 54.

The second voltage converter 54 is a unidirectional DC/DC converter using the low voltage battery 50 as a voltage source. The second voltage converter 54 performs output voltage control of raising (adjusting) a voltage from the low voltage battery 50 (third branch line 52A), and applying the raised voltage (adjusted voltage) to the fuel cell stack 36 through the input/output line 40.

The third voltage converter 64 has one side connected to a bypass line 62, and an opposite side connected to the low voltage battery 50 through the low voltage line 52. The third voltage converter 64 is a bidirectional DC/DC converter using the high voltage battery circuit 14 (or fuel cell stack 36) as one voltage source and the low voltage battery 50 as an opposite voltage source.

If the low voltage battery 50 is to be charged, the third voltage converter 64 performs output voltage control of reducing (adjusting) a voltage from the high voltage battery circuit 14 (bypass line 62), and applying the reduced voltage (adjusted voltage) to the low voltage battery 50 through the low voltage line 52. Conversely, if electricity is to be discharged from the low voltage battery 50 toward the bypass line 62, the third voltage converter 64 performs output voltage control of raising a voltage from the low voltage battery 50 (low voltage line 52), and applying the raised voltage toward the bypass line 62.

A fifth relay 46A (cutoff circuit) and a sixth relay 46B (cutoff circuit) for on-off switching of conduction through the connection line 34 are provided between the connection line 34 and the first branch line 12A. The fifth relay 46A has one side connected to the positive side of the first branch line 12A, and an opposite side connected to the positive side of the connection line 34. The sixth relay 46B has one side connected to the negative side of the first branch line 12A, and an opposite side connected to the negative side of the connection line 34. The fifth relay 46A and the sixth relay 46B are in a conducting state (ON state) when the vehicle is driven (including a state of what is called idling stop (temporary stop)). When the vehicle is stopped, however, the high voltage battery circuit 14 is cut off from the high voltage line 12 to reduce a voltage at the high voltage line 12. In this way, conduction through the fifth relay 46A and the sixth relay 46B is cut off (the fifth relay 46A and the sixth relay 46B are placed in an OFF state).

A third charging circuit 48 is provided so as to step over the fifth relay 46A. The third charging circuit 48 is a series circuit with a seventh relay 46C and a third charging resistor 48A. The third charging circuit 48 has one side connected to the positive side of the first branch line 12A, and an opposite side connected to the positive side of the connection line 34.

The third charging circuit 48 is to be used temporarily for electrically connecting the first branch line 12A and the connection line 34 to apply electrical charge to a capacitor of the first voltage converter 42 adjacent to the connection line 34 and a capacitor of the third voltage converter 64 adjacent to the bypass line 62. This avoids a flow of a rush current when the first branch line 12A and the connection line 34 are electrically connected, thereby avoiding breakage of the high voltage battery circuit 14, the first voltage converter 42, and the third voltage converter 64.

The first voltage converter 42 is provided with a second discharging circuit 44. The second discharging circuit 44 is to be operated when the fifth relay 46A and the sixth relay 46B are in an OFF state. The second discharging circuit 44 is to reduce a voltage at the connection line 34 by discharging the capacitor of the first voltage converter 42 adjacent to the connection line 34. The connection line 34 is connected to the bypass line 62. Thus, turning on the second discharging circuit 44 can discharge the capacitor of the third voltage converter 64 adjacent to the bypass line 62 as well as the capacitor of the first voltage converter 42 adjacent to the connection line 34. In this way, a voltage at the connection line 34 and a voltage at the bypass line 62 can be reduced by turning on the second discharging circuit 44.

A voltage sensor 56 (failure detection part) and a current sensor 58 (failure detection part) are attached to the second branch line 40A. The voltage sensor 56 and the current sensor 58 measure an output side voltage and an output side current at the second voltage converter 54. An eighth relay 60 is attached to the second branch line 40A. The eighth relay 60 normally places the second branch line 40A in a conducting state. However, on the occurrence of a failure at the second voltage converter 54 described later, the eighth relay 60 cuts off the conduction through the second branch line 40A.

The voltage sensor 56 and the current sensor 58 may be arranged so as to allow detection of a voltage and a current at positions on the input/output line 40 near the fuel cell stack 36. If the detected voltage and the detected current are lower than a set voltage and a set current for the second voltage converter 54, the controller 70 may determine that the second voltage converter 54 has failed.

A fuel cell auxiliary machine 68 is connected to the third branch line 52A through a fourth voltage converter 66. While not shown in the drawings, the fuel cell auxiliary machine 68 includes a fuel pump for supply of fuel gas to the fuel cell stack 36, a compressor for supply of oxidizing gas to the fuel cell stack 36, a valve for adjustment of the flow rate of the fuel gas or that of the oxidizing gas to be supplied to the fuel cell stack 36, a startup combustor for startup of the fuel cell stack 36, etc. Additionally, devices belonging to the vehicle are electrically connected to the third branch line 52A.

The controller 70 is configured using a microcomputer including a central processing unit (CPU), a read-only memory (ROM), a random access memory (RAM), and an input/output interface (I/O interface). The controller 70 can be configured using multiple microcomputers. The controller 70 is connected to the foregoing components of the vehicle system 10, and can perform startup control, normal power generation control, and stop control described later.

The controller 70 serves both as high voltage storage device state detection means configured to detect the charged amount (state) of the high voltage battery circuit 14 (main power supply 16), and as low voltage storage device state detection means configured to detect the charged amount (state) of the low voltage battery 50. These types of detection means may be provided independently. The controller 70 is to control the first voltage converter 42, the second voltage converter 54, and the third voltage converter 64. These voltage converters may be controlled by respective control parts. Additionally, the controller 70 may serve as a failure detection part to determine whether the second voltage converter 54 issues a PWM signal or a PFM signal normally.

[Procedure of Startup Control Over Vehicle System]

Figure 2:
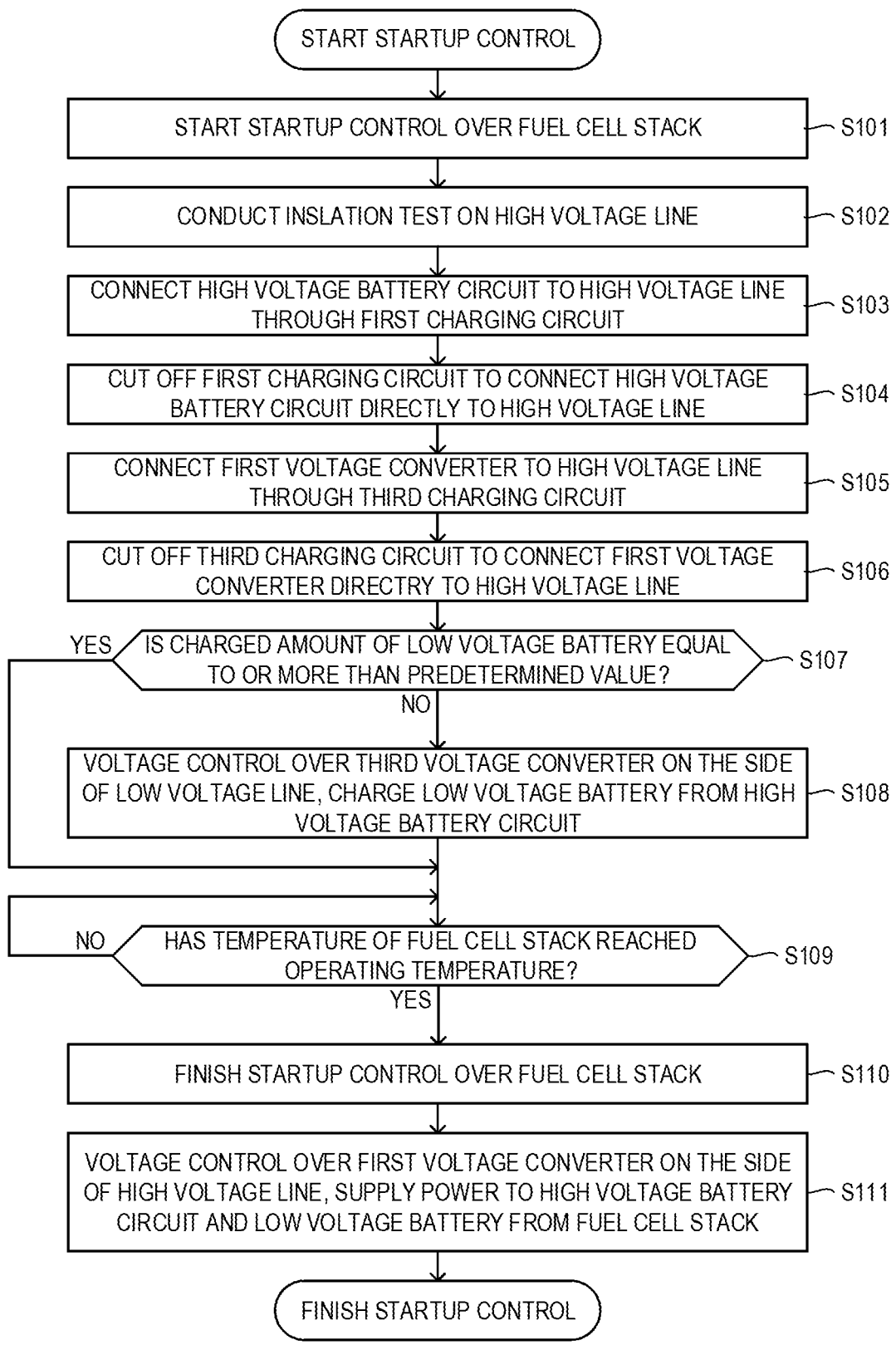
FIG. 2 is a flowchart showing a procedure of startup control over the vehicle system according to this embodiment.

A procedure of startup control over the vehicle system 10 of this embodiment will be described by following the flowchart of FIG. 2. The startup control over the vehicle system 10 includes control of connecting the high voltage battery circuit 14 to the high voltage line 12 and charging the low voltage battery 50 with the high voltage battery circuit 14 if the charged amount of the low voltage battery 50 is smaller than a predetermined value, while performing startup control for making the fuel cell stack 36 generate power. In an initial state, the first to fourth relays 18A to 18D are in an OFF state, the fifth relay 46A to the seventh relay 46C are in an OFF state, and the eighth relay 60 is in an ON state. Further, a voltage at the high voltage line 12 and a voltage at the connection line 34 have been reduced to a voltage equal to or less than a predetermined voltage (60 V, for example). The main power supply 16 in the high voltage battery circuit 14 is charged to a charged amount equal to or more than a predetermined value.

When the system starts the startup control, the controller 70 drives the fourth voltage converter 66 in step S101 to start the auxiliary machine (compressor, pump, startup combustor, etc.), thereby starting the startup control over the fuel cell stack 36. In this step, the auxiliary machine is driven with power from the low voltage battery 50. During implementation of the startup control, the startup combustor is supplied with fuel and air for startup, causes combustion of mixed gas containing the supplied fuel and air to generate combustion gas, and supplies the generated combustion gas instead of oxidizing gas to the cathode of the fuel cell stack 36, thereby heating the fuel cell stack 36 to a temperature necessary for power generation (a temperature that allows conduction of oxygen ions through the electrolyte layer).

In step S102, the controller 70 conducts an insulation test on the high voltage line 12 using the IR sensor 32. If an insulation resistance is determined to be favorable, the procedure goes to subsequent step S103. If the insulation resistance is determined to be poor, the controller 70 issues an alarm about the insulation abnormality and stops the startup control.

In step S103, the controller 70 turns on the second relay 18B and the third relay 18C. This connects the high voltage battery circuit 14 to the high voltage line 12 through the first charging circuit 22 to raise a voltage at the high voltage line 12 and a voltage at the inverter 26 to a predetermined voltage (from 240 to 400 V, for example). In this step, the controller 70 further turns on the fourth relay 18D to pass a current further through the second charging circuit 24 connected in parallel to the inverter 26.

After a predetermined period has passed since implementation of step S103, the controller 70 turns on the first relay 18A and then turns off the third relay 18C in step S104 to cut off the first charging circuit 22, thereby connecting the high voltage battery circuit 14 directly to the high voltage line 12. In this step, the controller 70 further turns off the fourth relay 18D to cut off the second charging circuit 24. This supplies the motor 28 with power from the high voltage battery circuit 14, so that the motor 28 becomes capable of rotating at any rotation speed on the basis of driver's operation on an accelerator.

In step S105, the controller 70 turns on the sixth relay 46B and the seventh relay 46C to electrically connect both the side of the first voltage converter 42 (capacitor thereof) connecting to the connection line 34 and the side of the third voltage converter 64 (capacitor thereof) connecting to the bypass line 62 to the high voltage line 12 through the third charging circuit 48, thereby raising a voltage at (charging) the first voltage converter 42 and the third voltage converter 64 to a voltage at the high voltage line 12.

After a predetermined period has passed since implementation of step S105, the controller 70 turns on the fifth relay 46A and turns off the seventh relay 46C in step S106, thereby connecting the high voltage line 12 directly to the connection line 34.

In step S107, the controller 70 detects the charged amount of the low voltage battery 50, and determines whether the detected charged amount is equal to or more than a predetermined value. If the controller 70 determines as YES (positive), that is, if the charged amount is equal to or more than the predetermined value, the procedure proceeds to step S109 described later. If the controller 70 determines as NO (negative), that is, if the charged amount is smaller than the predetermined amount, the procedure proceeds to step S108 described later.

In step S108, the controller 70 turns on the third voltage converter 64, and applies a predetermined voltage (24 V, for example) to the low voltage line 52. In this step, the third voltage converter 64 performs output voltage control on the side connecting to the low voltage line 52. Thus, the low voltage battery 50 is charged from the high voltage battery circuit 14 through the third voltage converter 64. The auxiliary machine for making the fuel cell stack 36 generate power can be driven by being supplied with power from the low voltage battery 50 and the third voltage converter 64.

In step S109, the controller 70 determines whether the fuel cell stack 36 has reached an operating temperature necessary for power generation on the basis of a temperature measured by the temperature sensor 38. If the controller 70 determines as NO (negative), a state having been produced until step S107 or step S108 is maintained. If the controller 70 determines as YES (positive), the controller 70 stops supply of fuel and air to the startup combustor and stops the operation of the startup combustor in step S110, thereby stopping the startup control over the fuel cell stack 36. Next, the controller 70 supplies the anode of the fuel cell stack 36 with fuel gas (reformed gas) and supplies the cathode of the fuel cell stack 36 with oxidizing gas (air) to cause electrochemical reaction, thereby making the fuel cell stack 36 generate power.

In step S111, the controller 70 turns on the first voltage converter 42 to place the first voltage converter 42 in an output voltage control state on the side connecting to the connection line 34. This makes the fuel cell stack 36 supply the generated power to the high voltage battery circuit 14 through the first voltage converter 42 to allow supply of the power to the low voltage line 52 through the third voltage converter 64. Then, the startup control over the vehicle system 10 is finished.

[Normal Power Generation Control Over Vehicle System]

The motor 28 is supplied with power from the high voltage battery circuit 14 and the fuel cell stack 36 to rotate at any rotation number in response to driver's operation on an accelerator. The motor 28 generates regenerative power when a brake is applied, and the generated regenerative power is charged to the high voltage battery circuit 14 through the inverter 26.

If the charged amount of the high voltage battery circuit 14 is smaller than a predetermined value, the fuel cell stack 36 charges the high voltage battery circuit 14 through the first voltage converter 42. Even when the vehicle is in a state of what is called idling stop (temporary stop), the high voltage battery circuit 14 is still charged from the fuel cell stack 36 as long as the high voltage battery circuit 14 requires charging. If the charged amount of the high voltage battery circuit 14 becomes equal to or more than the predetermined value, stop control described later is performed over the fuel cell stack 36.

The low voltage battery 50 is charged by being supplied with power from the high voltage battery circuit 14 and/or the fuel cell stack 36 through the third voltage converter 64. If the charged amount of the low voltage battery 50 becomes equal to or more than a predetermined value, charging of the low voltage battery 50 through the third voltage converter 64 is stopped. The controller 70 performs these operations as normal power generation control.

[Stop Control Over Fuel Cell Stack]

In this embodiment, the fuel cell stack 36 is subjected to the stop control in situations such as, for example, when the vehicle is to be stopped to stop the system entirely, when the charged amount of the high voltage battery circuit 14 is equal to or more than a predetermined value so that the fuel cell stack 36 is not required to generate power even when the vehicle is driven, and when the high voltage battery circuit 14 is required to be cut off from the high voltage line 12 on the occurrence of system errors such as electrical leaks.

For the stop control over the fuel cell stack 36, the pump is stopped to stop supply of fuel gas. While the compressor is operated continuously, oxidizing gas is supplied as cooling gas to reduce the temperature of the fuel cell stack 36 to a predetermined temperature at which oxidation of the anode electrode can be prevented. For this control, a protection voltage for protecting the anode electrode from oxidation is required to be applied to the fuel cell stack 36. The protection voltage has a voltage value (60 V, for example) comparable to an open-circuit voltage applied when the fuel cell stack 36 generates power.

During this control, the controller 70 performs switching control over the first voltage converter 42 and the third voltage converter 64 for switching a voltage conversion direction on the basis of the running state (driving or stopping) of the vehicle. By doing so, the controller 70 selects either the high voltage battery circuit 14 or the low voltage battery 50a as a source for the protection voltage, and switches a supply path for the protection voltage as follows. In particular, even if the second voltage converter 54 fails for some reason, a path for the protection voltage can still be changed.

[Procedure of Stop Control Over Vehicle System]

In this embodiment, stop control over the vehicle system 10 following the stop of the vehicle includes stop control over the fuel cell stack 36, while performing control of cutting off the high voltage battery circuit 14 from the high voltage line 12.

A procedure of the stop control over the vehicle system 10 of this embodiment will be described by following the flowchart of FIG. 3. In step S201, the controller 70 turns off the first relay 18A and the second relay 18B to cut off the high voltage battery circuit 14 from the high voltage line 12.

In step S202, the controller 70 turns off the fifth relay 46A and the sixth relay 46B to cut off the connection line 34 from the high voltage line 12, and turns on the first discharging circuit 30 to reduce a voltage at the high voltage line 12. This reduces the voltage at the high voltage line 12. Meanwhile, the connection line 34 and the bypass line 62 are maintained at voltages before the cutoff. Further, the charged state of the capacitor of the first voltage converter 42 on the side connecting to the connection line 34 and the charged state of the capacitor of the third voltage converter 64 on the side connecting to the bypass line 62 are also maintained, respectively.

In step S203, the controller 70 starts the stop control over the fuel cell stack 36. For this control, the controller 70 turns on the second voltage converter 54. This makes the low voltage battery 50 apply a protection voltage to the fuel cell stack 36 through the second voltage converter 54.

In step S204, the controller 70 determines whether or not a voltage value detected by the voltage sensor 56 or a current value detected by the current sensor 58 is equal to or more than a corresponding predetermined value.

In step S204, if the controller 70 determines as YES (positive), that is, if the controller 70 determines that the voltage value or the current value is equal to or more than the corresponding predetermined value, the procedure proceeds to step S207 described later. Meanwhile, if the controller 70 determines as NO (negative), that is, if the voltage value or the current value is smaller than the corresponding predetermined value, the controller 70 turns off (cuts oft) the eighth relay 60 in step S205 in order to avoid adverse effects on the fuel cell stack 36 by the second voltage converter 54. The presence or absence of a failure at the second voltage converter 54 can also be determined on the basis of the presence or absence of abnormality at a PWM signal or a PFM signal (on the basis of the absence of signal oscillation transmission, for example). Then, the following procedure is taken for applying the protection voltage from the low voltage battery 50 to the fuel cell stack 36 through the third voltage converter 64 and the first voltage converter 42.

In step S206, the controller 70 switches the first voltage converter 42 to output voltage control on the side connecting to the input/output line 40, and switches the third voltage converter 64 to output voltage control on the side connecting to the bypass line 62. By doing so, the protection voltage output from the low voltage battery 50 is applied to the fuel cell stack 36 through the low voltage line 52, the third voltage converter 64, the bypass line 62, the connection line 34, the first voltage converter 42, and the input/output line 40.

In this step, the bypass line 62 and the connection line 34 are maintained substantially at voltages before the fifth relay 46A and the sixth relay 46B are cut off. Thus, there substantially is no need to raise a voltage at the bypass line 62 and a voltage at the connection line 34. This achieves corresponding reduction in power consumption by the low voltage battery 50.

In step S207, on the basis of a temperature detected by the temperature sensor 38, the controller 70 determines whether the temperature of the fuel cell stack 36 has been reduced to a predetermined temperature at which oxidation of the anode electrode can be prevented. If the controller 70 determines as NO (negative), the procedure returns to step S204.

Meanwhile, if the controller 70 determines as YES (positive), the controller 70 finishes the stop control over the fuel cell stack 36 in step S208. In this step, the controller 70 turns off the compressor, the first voltage converter 42, the second voltage converter 54, and the third voltage converter 64. By doing so, supply of cooling gas to the fuel cell stack 36 and application of the protection voltage thereto are stopped.

In step S209, the controller 70 turns on the second discharging circuit 44 to reduce a voltage at the connection line 34 and a voltage at the bypass line 62. Then, the stop control over the vehicle system 10 is finished.

Figure 3:
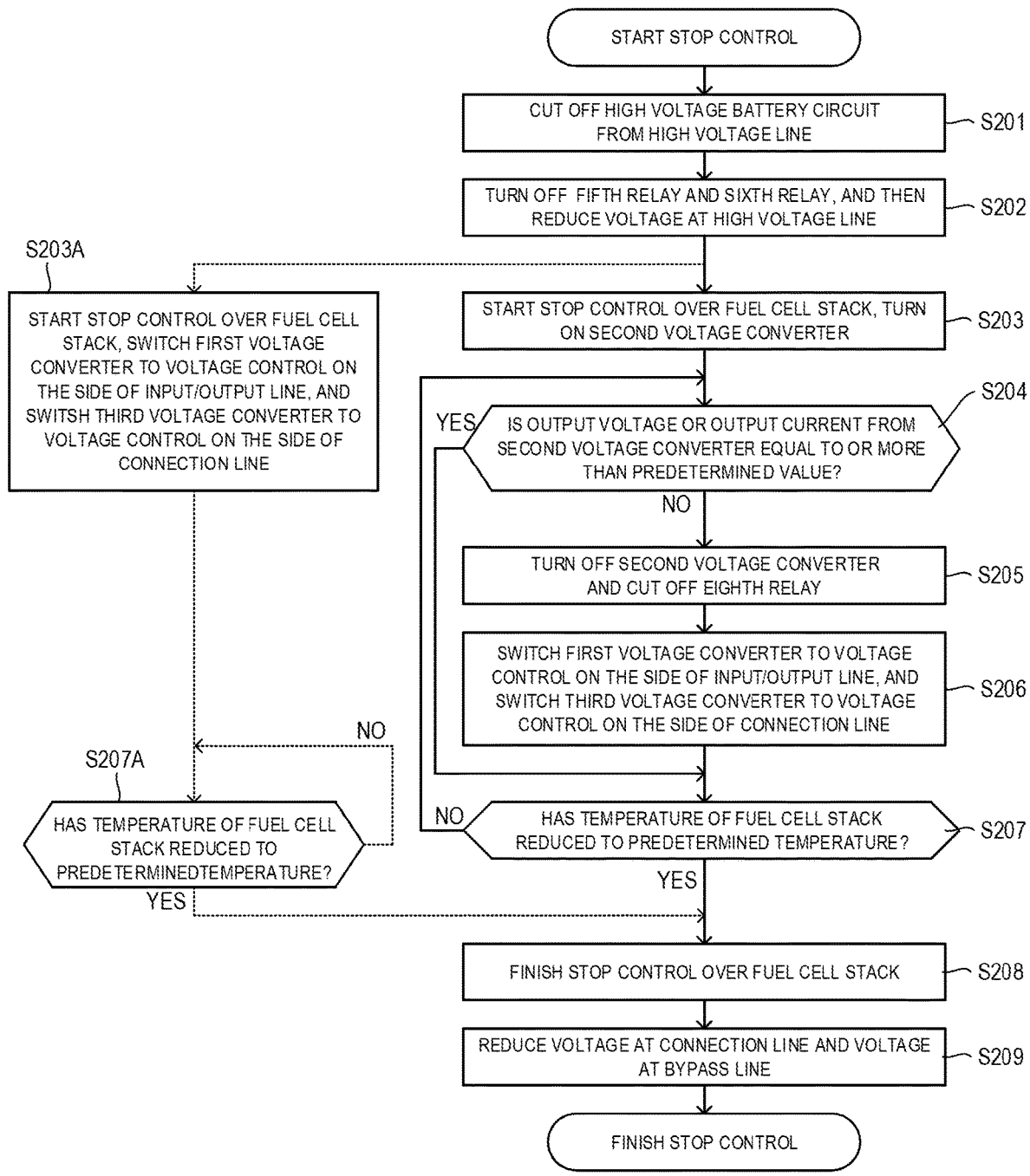
FIG. 3 is a flowchart showing a procedure of stop control over the vehicle system according to this embodiment.

As shown in FIG. 3, after implementation of step S202, step S203A and step S207A may be performed instead of steps from step S203 to step S207. In step S203A, the controller 70 starts the stop control over the fuel cell stack 36. In this control, the controller 70, without turning on the second voltage converter 54, switches the first voltage converter 42 to output voltage control on the side connecting to the input/output line 40, and switches the third voltage converter 64 to output voltage control on the side connecting to the bypass line 62.

In step S207A, on the basis of a temperature detected by the temperature sensor 38, the controller 70 determines whether the temperature of the fuel cell stack 36 has reduced to a predetermined temperature at which oxidation of the anode electrode can be prevented. If the controller 70 determines as NO (negative), the state after implementation of step S203A is maintained. If the controller 70 determines as YES (positive), the procedure proceeds to step S208 described above. This procedure is suitably taken in a case where, before implementation of the stop control over the fuel cell stack 36, the presence of a failure at the second voltage converter 54 is known in advance (if the eighth relay 60 is cut off) on the basis of the presence or absence of a PMW signal or a PFM signal, or the presence of trouble at the PMW signal or the PFM signal.

[Procedure of Stop Control Over Fuel Cell Stack when Vehicle is Driven]

Figure 4:
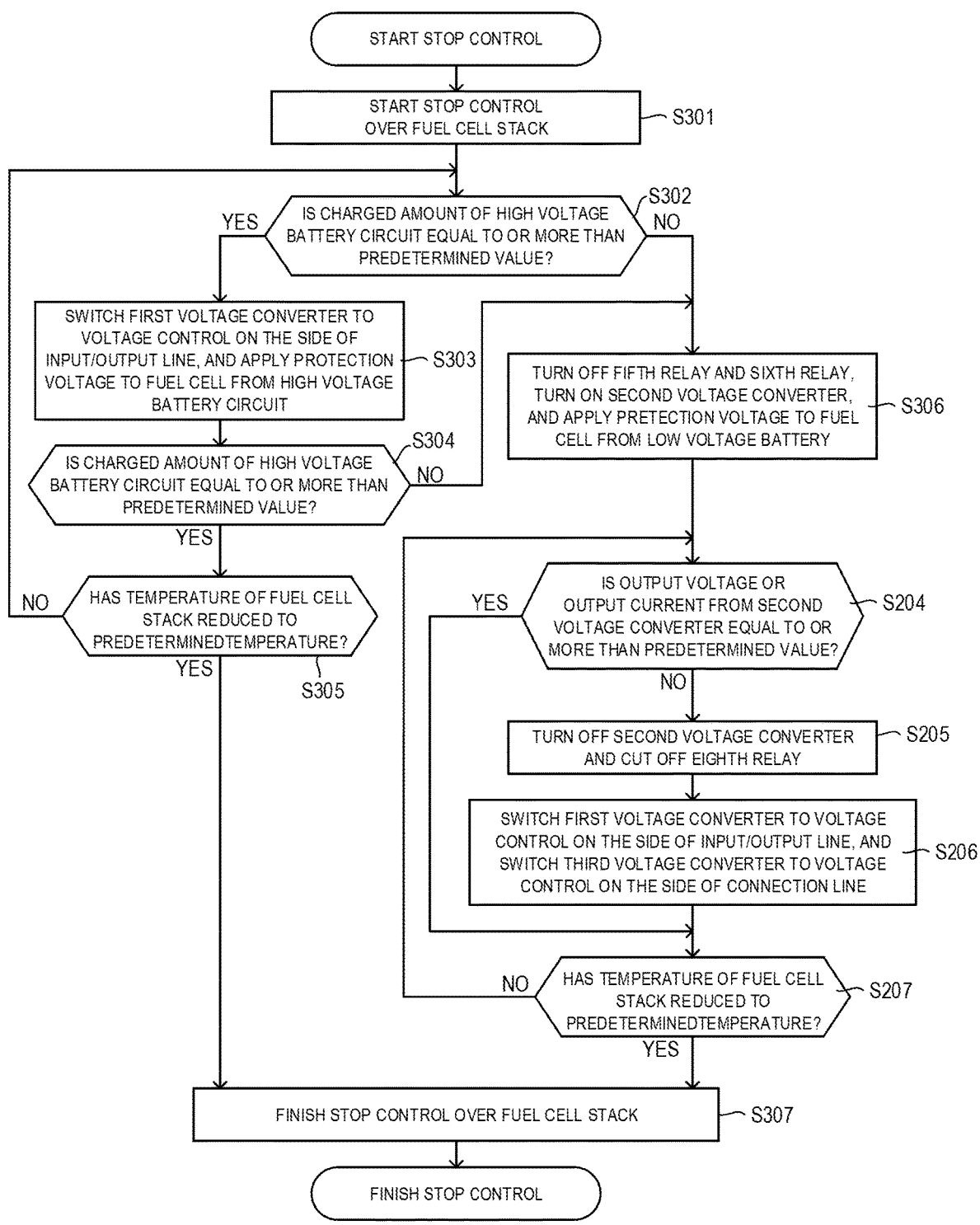
FIG. 4 is a flowchart showing a procedure of control of stopping a fuel cell stack when a vehicle of the vehicle system according to this embodiment is driven.

A procedure of control of stopping the fuel cell stack 36 during driving of the vehicle of the vehicle system 10 according to this embodiment will be described by referring to the flowchart of FIG. 4. In this control, if the charged amount of the high voltage battery circuit 14 is equal to or more than a predetermined value, the high voltage battery circuit 14 applies the protection voltage to the fuel cell stack 36. If the charged amount is smaller than the predetermined value, the low voltage battery 50 applies the protection voltage to the fuel cell stack 36.

In step S301, the controller 70 starts the stop control over the fuel cell stack 36. In this step, the controller 70 maintains the first relay 18A, the second relay 18B, the fifth relay 46A, and the sixth relay 46B in an ON state. The third voltage converter 64 may be in an ON state or an OFF state.

In step S302, the controller 70 determines whether the charged amount of the high voltage battery circuit 14 is equal to or more than the predetermined value. If the controller 70 determines as YES (positive), that is, if the charged amount is equal to or more than the predetermined value, the procedure proceeds to subsequent step S303. Conversely, if the controller 70 determines as NO (negative), that is, if the charged amount is smaller than the predetermined value, the procedure proceeds to step S306 described later.

In step S303, the controller 70 switches the first voltage converter 42 to output voltage control on the side connecting to the input/output line 40. This makes the high voltage battery circuit 14 apply the protection voltage to the fuel cell stack 36 through the first voltage converter 42.

In step S304, the controller 70 determines whether or not the charged amount of the high voltage battery circuit 14 maintains a state of being larger than the predetermined value while the high voltage battery circuit 14 applies the protection voltage to the fuel cell stack 36. If the controller 70 determines as YES (positive), the procedure proceeds to subsequent step S305. If the controller 70 determines as NO (negative), the procedure proceeds to step S306 described later.

In step S305, on the basis of a temperature detected by the temperature sensor 38, the controller 70 determines whether the temperature of the fuel cell stack 36 has reduced to a predetermined temperature at which oxidation of the anode electrode can be prevented. If the controller 70 determines as NO (negative), the procedure returns to step S302. If the controller 70 determines as YES (positive), the procedure proceeds to subsequent step S307.

In step S307, the controller 70 finishes the stop control over the fuel cell stack 36. In this step, the controller 70 turns off the compressor and the first voltage converter 42. By doing so, supply of cooling gas to the fuel cell stack 36 and application of the protection voltage thereto are stopped. Meanwhile, if the third voltage converter 64 is in an ON state, the controller 70 may maintain this state continuously. This allows the high voltage battery circuit 14 to charge the low voltage battery 50 continuously through the third voltage converter 64.

If the controller 70 determines as NO (negative) in step S302 or step S304, the controller 70 turns off the fifth relay 46A and the sixth relay 46B in step S306 to cut off the connection line 34 from the high voltage line 12. This can avoid supply of power from the high voltage battery circuit 14 toward the connection line 34. Further, the controller 70 turns on the second voltage converter 54. By doing so, the low voltage battery 50 becomes capable of applying the protection voltage to the fuel cell stack 36 through the second voltage converter 54.

Next, the controller 70 performs the foregoing steps from step S204 to step S207, and then performs step S307. When the vehicle is driven, the high voltage battery circuit 14 is maintained in a state of being connected to the high voltage line 12. Thus, step S105 and its subsequent steps in FIG. 2 may be performed sequentially for making the fuel cell stack 36 restart power generation when the vehicle is driven.

[Advantageous Effects of Embodiment]

The vehicle system 10 according to this embodiment includes: the motor 28 configured to drive a vehicle; the high voltage battery circuit 14 connected to the motor 28 and configured to supply the motor 28 with power; the fuel cell stack 36 connected to the high voltage battery circuit 14 and configured to charge the high voltage battery circuit 14; and the low voltage battery 50 connected to the fuel cell stack 36. The vehicle system 10 includes: the bidirectional first voltage converter 42 interposed between the fuel cell stack 36 and the high voltage battery circuit 14, and configured to adjust a voltage at either of the fuel cell stack 36 or the high voltage battery circuit 14 and to supply power to the other; and the second voltage converter 54 interposed between the fuel cell stack 36 and the low voltage battery 50, and configured to adjust a voltage at the low voltage battery 50 and to apply the adjusted voltage to the fuel cell stack 36. The vehicle system 10 is characterized in that the vehicle system 10 includes the bidirectional third voltage converter 64 interposed between the high voltage battery circuit 14 and the low voltage battery 50, and configured to adjust a voltage at either of the high voltage battery circuit 14 or the low voltage battery 50 and to supply power to the other.

Thus, when the vehicle is driven (when the fuel cell stack 36 generates power), the low voltage battery 50 is charged by being supplied with power from the high voltage battery circuit 14 and the fuel cell stack 36 through the third voltage converter 64. This makes it possible to charge the low voltage battery 50 sufficiently in advance before implementation of the stop control over the fuel cell stack 36. As a result, the capacity of the low voltage battery 50 is not required to be increased, thereby allowing scale reduction of the system as a whole. Further, a path for application of a voltage (protection voltage) from the low voltage battery 50 to the fuel cell stack 36 is selectable not only from a supply path for applying the voltage from the second voltage converter 54 but also from a supply path for applying the voltage through the third voltage converter 64 and the first voltage converter 42. In this way, the system can be increased in reliability.

The vehicle system 10 includes: the controller 70 configured to control the first voltage converter 42 and the third voltage converter 64; and the low voltage storage device state detection means (controller 70) configured to detect the state (charged amount) of the low voltage battery 50. The vehicle system 10 is characterized in that the controller 70 performs control of charging the low voltage battery 50 from the high voltage battery circuit 14 through the third voltage converter 64 and/or from the fuel cell stack 36 through the first voltage converter 42 and the third voltage converter 64 on the basis of the state of the low voltage battery 50. In this way, the low voltage battery 50 is charged efficiently using the high voltage battery circuit 14 and/or the fuel cell stack 36, so that the charged amount of the low voltage battery 50 can be ensured before implementation of the stop control over the fuel cell stack 36.

The vehicle system 10 includes the high voltage storage device state detection means (controller 70) configured to detect the state (charged amount) of the high voltage battery circuit 14. The vehicle system 10 is characterized in that the controller 70, upon implementation of the stop control over the fuel cell stack 36, further controls the second voltage converter 54, and if the high voltage battery circuit 14 is in an OFF state, or if the high voltage battery circuit 14 is in an ON state and the charged amount of the high voltage battery circuit 14 is smaller than a predetermined value, the controller 70 performs control of applying a voltage (protection voltage) to the fuel cell stack 36 from the low voltage battery 50 through the second voltage converter 54, or from the low voltage battery 50 through the third voltage converter 64 and the first voltage converter 42. By doing so, multiple sources and multiple paths for supplying the voltage (protection voltage) are provided, so that the system as a whole can be increased in reliability.

The vehicle system 10 includes the high voltage storage device state detection means (controller 70) configured to detect the state (charged amount) of the high voltage battery circuit 14. The vehicle system 10 is characterized in that the controller 70, upon implementation of the stop control over the fuel cell stack 36, further controls the second voltage converter 54, and if the high voltage battery circuit 14 is in an OFF state, or if the charged amount of the high voltage battery circuit 14 is smaller than the predetermined value, the controller 70 performs control of applying a voltage (protection voltage) to the fuel cell stack 36 from the low voltage battery 50 through the second voltage converter 54. This makes the low voltage battery 50 apply a voltage to the fuel cell stack 36 only if the high voltage battery circuit 14 is in a state in which the high voltage battery circuit 14 is incapable of applying a voltage to the fuel cell stack 36. This achieves corresponding reduction in power consumption by the low voltage battery 50.

The vehicle system 10 includes the failure detection part (voltage sensor 56, current sensor 58, controller 70) configured to determine the presence or absence of a failure at the second voltage converter 54. The vehicle system 10 is characterized in that, if the controller 70 detects a failure while a voltage (protection voltage) is applied from the low voltage battery 50 to the fuel cell stack 36 through the second voltage converter 54, the controller 70 stopes driving of the second voltage converter 54, and performs control of applying a voltage (protection voltage) from the low voltage battery 50 to the fuel cell stack 36 through the third voltage converter 64 and the first voltage converter 42. Thus, even if the second voltage converter 54 fails, the low voltage battery 50 can still apply the protection voltage continuously to the fuel cell stack 36 through the third voltage converter 64 and the first voltage converter 42.

The vehicle system 10 is characterized in that, if the controller 70 detects a failure, the controller 70 switches from output voltage control on the side of the first voltage converter 42 connecting to the high voltage battery circuit 14 to output voltage control on the side of the first voltage converter 42 connecting to the fuel cell stack 36, and switches from output voltage control on the side of the third voltage converter 64 connecting to the low voltage battery 50 to output voltage control on the side of the third voltage converter 64 connecting to the first voltage converter 42. This allows the low voltage battery 50 to apply the protection voltage to the fuel cell stack 36 through the third voltage converter 64 and the first voltage converter 42 only by changing control over the first voltage converter 42 and control over the third voltage converter 64.

The vehicle system 10 is characterized in that the second voltage converter 54 and the fuel cell stack 36 are connected through the eighth relay 60, and if the controller 70 detects a failure, the controller 70 performs control of cutting off conduction through the eighth relay 60. By doing so, when the second voltage converter 54 fails, short-circuiting of the fuel cell stack 36, for example, which is to be caused through the failed second voltage converter 54, is prevented, thereby ensuring the safety of the system as a whole.

The vehicle system 10 is characterized in that the failure detection part (voltage sensor 56, current sensor 58) detects a voltage or a current between the second voltage converter 54 and the fuel cell stack 36, and determines the presence of a failure if the detected voltage or current is smaller than a predetermined value. This makes it possible to detect a failure at the second voltage converter 54 reliably by a simple way.

The vehicle system 10 is characterized in that, if the high voltage battery circuit 14 is in an ON state and the charged amount of the high voltage battery circuit 14 is equal to or more than the predetermined value upon implementation of the stop control over the fuel cell stack 36, the controller 70 performs control of applying a voltage (protection voltage) from the high voltage battery circuit 14 to the fuel cell stack 36 through the first voltage converter 42. In this way, the high voltage battery circuit 14 applies the protection voltage to the fuel cell stack 36 when the vehicle is driven to achieve corresponding reduction in power consumption by the low voltage battery 50.

The vehicle system 10 is characterized in that the controller 70 switches from output voltage control on the side of the first voltage converter 42 connecting to the high voltage battery circuit 14 to output voltage control on the side of the first voltage converter connecting to the fuel cell stack 36. This allows application of the protection voltage to the fuel cell stack 36 through the first voltage converter 42 only by changing control over the first voltage converter 42.

The invention claimed is:

1. A vehicle system, comprising:
a motor configured to drive a vehicle;
a high voltage storage device connected to the motor and configured to supply the motor with power;
a fuel cell connected to the high voltage storage device and configured to charge the high voltage storage device;
a low voltage storage device connected to the fuel cell;
a bidirectional first voltage converter interposed between the fuel cell and the high voltage storage device, configured to adjust a voltage from one of the fuel cell or the high voltage storage device and to supply power to the other of the fuel cell or the high voltage storage device;
a second voltage converter interposed between the fuel cell and the low voltage storage device, configured to adjust a voltage from the low voltage storage device and to apply the adjusted voltage to the fuel cell; and
a bidirectional third voltage converter interposed between the high voltage storage device and the low voltage storage device, configured to adjust a voltage from one of the high voltage storage device or the low voltage storage device and to supply power to the other of the high voltage storage device or the low voltage storage device, wherein
a first end of the bidirectional first voltage converter and a first end of the second voltage converter are connected in parallel to the fuel cell,
a second end of the bidirectional first voltage converter and a first end of the bidirectional third voltage converter are connected in parallel to the high voltage storage device, and
a second end of the second voltage converter and a second end of the bidirectional third voltage converter are connected in parallel to the low voltage storage device.

2. The vehicle system according to claim 1, comprising:
a control part configured to control the first voltage converter and the third voltage converter; and
low voltage storage device state detection means configured to detect the state of the low voltage storage device, wherein
the control part performs control of charging the low voltage storage device from the high voltage storage device through the third voltage converter and/or from the fuel cell through the first voltage converter and the third voltage converter on the basis of the state of the low voltage storage device.

3. The vehicle system according to claim 2, comprising:
high voltage storage device state detection means configured to detect the state of the high voltage storage device, wherein
the control part further controls the second voltage converter, and upon implementation of stop control over the fuel cell, if the high voltage storage device is in an OFF state, or if the high voltage storage device is in an ON state and the charged amount of the high voltage storage device is smaller than a predetermined value, the control part performs control of applying a voltage to the fuel cell from the low voltage storage device through the second voltage converter, or from the low voltage storage device through the third voltage converter and the first voltage converter.

4. The vehicle system according to claim 3, wherein upon implementation of the stop control over the fuel cell, if the high voltage storage device is in an ON state and the charged amount of the high voltage storage device is equal to or more than the predetermined value, the control part performs control of applying a voltage from the high voltage storage device to the fuel cell through the first voltage converter.

5. The vehicle system according to claim 4, wherein the control part switches from output voltage control on the side of the first voltage converter connecting to the high voltage storage device to output voltage control on the side of the first voltage converter connecting to the fuel cell.

6. The vehicle system according to claim 2, comprising: high voltage storage device state detection means configured to detect the state of the high voltage storage device, wherein
the control part further controls the second voltage converter, and upon implementation of stop control over the fuel cell, if the high voltage storage device is in an OFF state, or if the charged amount of the high voltage storage device is smaller than a predetermined value, the control part performs control of applying a voltage to the fuel cell from the low voltage storage device through the second voltage converter.

7. The vehicle system according to claim 6, comprising: a failure detection part configured to determine the presence or absence of a failure at the second voltage converter, wherein
if the control part detects a failure while a voltage is applied from the low voltage storage device to the fuel cell through the second voltage converter, the control part stops driving of the second voltage converter, and performs control of applying a voltage from the low voltage storage device to the fuel cell through the third voltage converter and the first voltage converter.

8. The vehicle system according to claim 7, wherein if the control part detects a failure, the control part switches from output voltage control on the side of the first voltage converter connecting to the high voltage storage device to output voltage control on the side of the first voltage converter connecting to the fuel cell, and switches from output voltage control on the side of the third voltage converter connecting to the low voltage storage device to output voltage control on the side of the third voltage converter connecting to the first voltage converter.

9. The vehicle system according to claim 7, wherein the second voltage converter and the fuel cell are connected through a relay, and
if the control part detects a failure, the control part performs control of cutting off conduction through the relay.

10. The vehicle system according to claim 7, wherein the failure detection part detects a voltage or a current between the second voltage converter and the fuel cell, and determines the presence of a failure if the detected voltage or current is smaller than a predetermined value.

11. The vehicle system according to claim 1, comprising: a controller configured to control the first voltage converter and the third voltage converter, wherein
the controller is configured to
detect the state of the low voltage storage device, and
perform control of charging the low voltage storage device from the high voltage storage device through the third voltage converter and/or from the fuel cell through the first voltage converter and the third voltage converter on the basis of the state of the low voltage storage device.

12. The vehicle system according to claim 11, wherein the controller is configured to:
detect the state of the high voltage storage device,
control the second voltage converter, and
upon implementation of stop control over the fuel cell, if the high voltage storage device is in an OFF state, or if the high voltage storage device is in an ON state and the charged amount of the high voltage storage device is smaller than a predetermined value, perform control of applying a voltage to the fuel cell from the low voltage storage device through the second voltage converter, or from the low voltage storage device through the third voltage converter and the first voltage converter.

13. The vehicle system according to claim 12, wherein upon implementation of the stop control over the fuel cell, if the high voltage storage device is in an ON state and the charged amount of the high voltage storage device is equal to or more than the predetermined value, the controller performs control of applying a voltage from the high voltage storage device to the fuel cell through the first voltage converter.

14. The vehicle system according to claim 13, wherein the controller switches from output voltage control on the side of the first voltage converter connecting to the high voltage storage device to output voltage control on the side of the first voltage converter connecting to the fuel cell.

15. The vehicle system according to claim 11, wherein the controller is configured to:
detect the state of the high voltage storage device,
control the second voltage converter, and
upon implementation of stop control over the fuel cell, if the high voltage storage device is in an OFF state, or if the charged amount of the high voltage storage device is smaller than a predetermined value, perform control of applying a voltage to the fuel cell from the low voltage storage device through the second voltage converter.

16. The vehicle system according to claim 15, wherein the controller is configured to:
determine the presence or absence of a failure at the second voltage converter,
if the controller detects a failure while a voltage is applied from the low voltage storage device to the fuel cell through the second voltage converter, stop driving of the second voltage converter, and
perform control of applying a voltage from the low voltage storage device to the fuel cell through the third voltage converter and the first voltage converter.

17. The vehicle system according to claim 16, wherein if the controller detects a failure, the controller switches from output voltage control on the side of the first voltage converter connecting to the high voltage storage device to output voltage control on the side of the first voltage converter connecting to the fuel cell, and switches from output voltage control on the side of the third voltage converter connecting to the low voltage storage device to output voltage control on the side of the third voltage converter connecting to the first voltage converter.

18. The vehicle system according to claim 16, wherein the second voltage converter and the fuel cell are connected through a relay, and
if the controller detects a failure, the controller performs control of cutting off conduction through the relay.

19. The vehicle system according to claim 16, wherein the controller detects a voltage or a current between the second voltage converter and the fuel cell, and determines the presence of a failure if the detected voltage or current is smaller than a predetermined value.

\* \* \* \* \*